United States Patent [19]
Locker

[11] Patent Number: 5,522,220
[45] Date of Patent: Jun. 4, 1996

[54] HIGH EFFICIENCY BLADE

[75] Inventor: Richard W. Locker, Livonia, Mich.

[73] Assignee: Ford Motor Company, Dearborn, Mich.

[21] Appl. No.: 812,424

[22] Filed: Dec. 23, 1991

[51] Int. Cl.$^6$ .................................................. F16D 33/00
[52] U.S. Cl. ........................ 60/361; 60/364; 60/365; 29/889.5; 416/180; 416/197 C; 416/223 R
[58] Field of Search ................. 416/180, 197 C, 416/223 R; 29/889.5; 60/361, 364, 365

[56]  References Cited

U.S. PATENT DOCUMENTS

| | | | |
|---|---|---|---|
| 2,115,895 | 5/1938 | Weihmann | 416/180 |
| 2,436,911 | 3/1948 | Zeidler | 416/180 |
| 2,799,228 | 7/1957 | Farrell | 103/115 |
| 2,807,217 | 9/1957 | Krzyszczuk | 60/364 |
| 2,813,606 | 11/1957 | Badin | 192/58 |
| 2,895,580 | 7/1959 | Badin | 192/58 |
| 3,184,833 | 5/1965 | Zeidler et al. | 29/888.5 |
| 3,673,659 | 7/1972 | Ishii et al. | 416/180 |
| 3,808,809 | 5/1974 | Upton | 60/364 |
| 3,816,024 | 6/1974 | Quinn | 416/210 |
| 3,879,949 | 4/1975 | Hays et al. | 60/649 |
| 3,891,350 | 6/1975 | Adachi et al. | 416/180 |
| 3,981,614 | 9/1976 | Helmer | 416/180 |
| 4,059,365 | 11/1977 | Ivey et al. | 416/180 |
| 4,098,080 | 7/1978 | Pogorelov et al. | 60/361 |
| 4,260,330 | 4/1981 | Frotschner et al. | 416/180 |
| 4,697,417 | 10/1987 | Billet et al. | 60/338 |
| 4,868,365 | 9/1989 | Farone et al. | 219/121.64 |
| 4,926,988 | 5/1990 | Kundermann | 192/3.3 |
| 4,944,374 | 7/1990 | Casse et al. | 192/3.29 |

FOREIGN PATENT DOCUMENTS

| | | | |
|---|---|---|---|
| 0533822 | 11/1956 | Canada | 29/889.5 |
| 0669168 | 3/1952 | United Kingdom | 29/889.5 |
| 752818 | 7/1956 | United Kingdom . | |

*Primary Examiner*—Thomas E. Denion
*Attorney, Agent, or Firm*—Frank G. McKenzie; Roger L. May

[57]  ABSTRACT

A vaned element of a fluid coupler such as a torque converter includes vanes having a depression extending from a leading surface area to a trailing edge of the vane. The depression avoids multiple surface layer changes which introduce turbulence to flow of fluid past the vane. The depression also forms reinforcing ribs in the form of raised walls which dimensionally stabilize the mounting tabs for the vane. In addition the vane construction is light weight since it permits the use of simple cross-sectionally shaped vanes while improving the speed capability of the torque converter and the strength of the vaned elements. The blade construction permits automated assembly techniques for the vaned elements.

12 Claims, 2 Drawing Sheets

HIGH EFFICIENCY BLADE

TECHNICAL FIELD

The present invention relates generally to apparatus and method for fluid couplings transferring kinetic energy, and more particularly to a method and apparatus for constructing torque converters with particularly shaped vanes in the vaned elements.

BACKGROUND ART

Torque converters used in the automatic transmissions of motor vehicles include vaned elements that form a substantially toroidal flow passage for the kinetic fluid in the torque converter. The stator, also known as reactor, the impeller or pump, and the turbine are each formed by an outer housing forming an outer wall of the toroidal path, a shroud forming the inner wall of the toroidal path, and a series of vanes between the housing and the shroud for controlling the flow of fluid through the toroidal path.

The impeller and the turbine are similarly shaped in a semi-toroidal shape as one is the driving member coupled to the input member driven by the engine, and the turbine is the driven member coupled to the output member leading into the transmission. It was previously known to assemble the vaned elements by including tabs on the vanes which entered apertures in the shroud and the housing. The tabs could then be coldworked to retain the vanes in a fixed position with respect to the shroud and the housing. An improved method of assembling vaned elements, which may be used in conjunction with the present invention, is disclosed in U.S. Pat. No. 4,868,365, and in which the tabs are laser welded in recesses of the outer housing.

While it is typical to align tabs with recesses in the housing and in the shroud, such alignments can be difficult to accomplish in automated production. For example, it is preferable to employ a flat blades in constructing the vaned elements, but vanes having a simple cross-sectional shape can be easily deformed. As a result, it has been extremely difficult to automate the installation of such vanes. Registration of the tabs with the recesses, particularly within the small tolerances which permit insertion into the openings, can be extremely difficult when the vanes are easily deformed from their intended shape. Thickening of the blades in order to retain the shape would be undesirable since it substantially increases the mass of material. Since a turbine must be moved by the kinetic fluid, such a construction substantially reduces the efficiency of the torque converter, and adds to the weight and material cost of the vehicle.

One previously known vane improvement avoiding this problem was a rib stamped within the body of the vane in order to maintain the dimensional stability of the vanes as they are transported, stored and delivered to an assembly operation. Unfortunately, it has been found that such ribs substantially increase the turbulence in the kinetic fluid flow through the torque converter. Such turbulence has a substantial impact on the energy transfer efficiency of the torque converter, particularly at the higher engine speeds which are becoming conventional in the industry in order to improve the efficiency of operating motor vehicles.

Other previously known improvements in blade design and fluid couplings address the strength or ease of assembly of the turbine components, and do not address the efficiency problem. For example, U.S. Pat. No. 3,891,350 discloses a torque converter impeller with a rib formed by a flange which seats on the inner surface of the housing for increased durability and rigidity of the blade structure. However, such a rib increases the difficulty of assembling the rib to the outer shell in proper alignment and thus may interfere with efficient fluid flow through the torque converter. Furthermore, the rib substantially adds to the weight of the impeller. U.S. Pat. No. 2,799,228 to Farrell discloses a vane construction in which paper vanes are coated by electrolytically plating with metal, and installed between members constructed in the same manner. Such a construction substantially complicates an automated assembly operation while reducing the mass of the vaned elements.

U.S. Pat. No. 4,098,080 to Pogorelov et al. discloses a conventional tongue attachment for vanes which is implemented by a plate extending through openings in the vane, and the vane is hydrodynamically profiled with varying cross-sectional shaping. U.S. Pat. No. 3,981,614 to Helmer discloses a blade construction in which a liner shell corresponding to the housing shape and the blades are cast together. The liner shell is secured to the adjacent housing for the impeller. These constructions substantially add to the mass of the vaned elements.

Substantially different techniques are also known for use in improving the efficiency of torque converters. For example, U.S. Pat. Nos. 4,944,374 to Casse et al., 4,926,988 to Kundermann and 4,697,417 to Billet et al. disclose improved torque converters which employ a clutch between the turbine and the torque converter casing to provide a lockup under certain conditions. However, the addition of a clutch between the element and the casing provides substantially more complex controls and parts than is required with vane improvements.

TECHNICAL PROBLEM RESOLVED

The present invention overcomes the above-mentioned disadvantages by providing a vane construction in which portions of the vane are reinforced without adding material and in a manner which improves the fluid flow so as to avoid turbulence which obstructs fluid flow. A depression is formed in the body at or near the leading edge and extends to the trailing edge of the vane. The blade preferably includes a leading surface area, preferably terminating in a tapered edge. As a result, the vane provides at most a single change of flow level along the flow path surface, particularly when the depression has a substantially flat bottom.

The depression extends transversely across a substantial portion of the blade to provide raised surface portions at the peripheral edges of the blade. Such raised surfaces form ribs which reinforce the dimensional stability of tabs employed in mounting the vanes to the housing or shroud of the vaned element. As a result, automated assembly and installation procedures can be employed with the vanes constructed in accordance with the present invention while providing substantially greater efficiency than previously known ribbed vanes. Moreover, the improved flow of the vanes also serves to provide greater speed capability (higher engine rpm) than previously known torque converter designs. In addition, the blade has improved strength over the previously known ribbed design.

As a result, it will be understood that the present invention permits a motor vehicle to obtain higher mileage ratings than conventionally known vehicles with automatic transmission. Moreover, automated production processes can be readily employed. Furthermore, substantially greater speeds can be attained with a drive train incorporating a torque converter constructed with vanes of the present invention since the resistance to flow is reduced and the mass of the torque converter elements is not adversely affected. Moreover, the blades are stronger and can withstand substantially greater forces at a higher rpm than previously known flat or ribbed blade constructions. The additional vane strength would also permit a reduction in the number of blades required in a vaned element. The combination of the laser-welding method mentioned above and the strengthened blade design reduces the need for strength previously considered necessary in the impeller housing and permits a reduction in the housing wall thickness. Such a reduction represents substantial weight saving and material cost advantages.

BRIEF DESCRIPTION OF THE DRAWING

The present invention will be more clearly understood by reference to the following detailed description when read in conjunction with the accompanying drawing in which like reference characters refer to like parts throughout the views and in which.

BEST MODE

Figure 1:
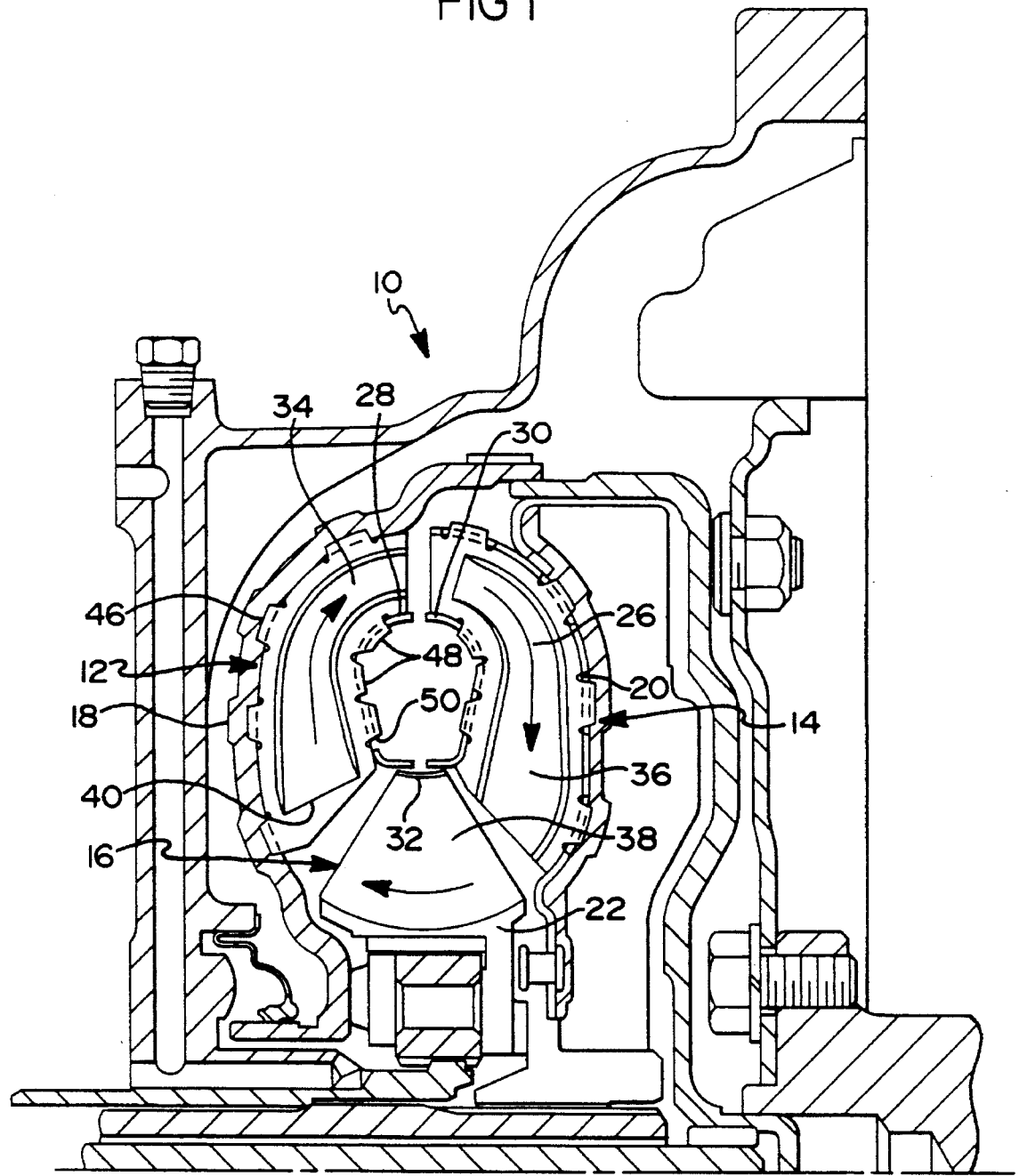
FIG. 1 is a broken sectional view of a portion of a torque converter assembly constructed with vanes according to the present invention.

Referring first to FIG. 1, a torque converter 10 is shown comprising an impeller 12, a turbine 14, and a stator 16. Each of the elements 12, 14, and 16 is made up of an outer casing 18, 20, and 22, respectively, defining the outer boundary of a substantially toroidal flow path diagrammatically indicated at 22. The interior boundary of the flow path in each element is made up of a shroud 28, 30 and 32, respectively. Each housing and its respective shroud are separated by a plurality of vanes 34, 36 and 38, respectively.

Figure 2:
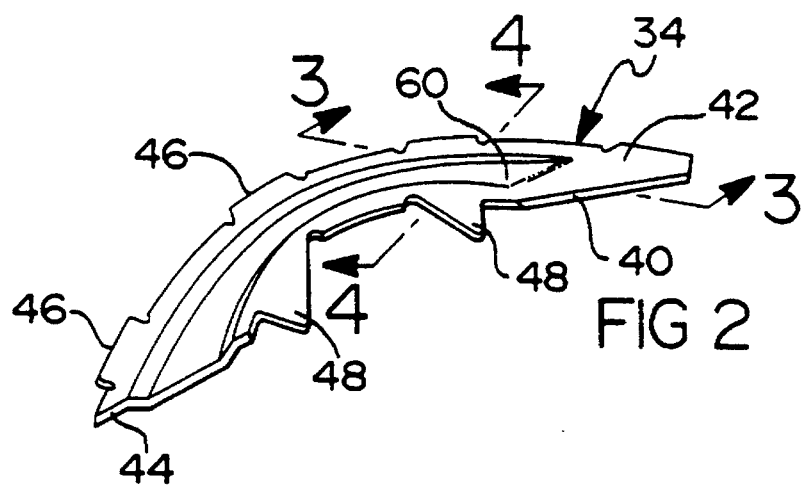
FIG. 2 is a perspective view of a turbine blade constructed in accordance with the present invention.

Although any of the vanes 34, 36 and 38 can be constructed in accordance with the present invention, only the impeller blade 34 is described here in detail for the sake of brevity. As best shown in FIG. 2, a vane or blade 34 has a leading edge 40 terminating a leading surface area 42. The leading surface area 42 is preferably flat since it comprises the impact, surface of the impeller blade and substantially affects the fluid flow throughout the remainder of the impeller 34. The blade 34 also includes a trailing edge 44. A plurality of tabs 46 extend outwardly from the blade along a peripheral edge of the blade 34 to engage recesses in the housing 18, while tabs 48 on the opposite peripheral edge of the blade 34 engage recesses in the form of openings 50 (FIG. 1) in the shroud 28. After insertion through the openings 50, the shroud 28 is secured to the vanes 34 by coldworking, welding or the like. The tabs 46 are preferably joined to the housing 18 by the method referred to in U.S. Pat. No. 4,868,365 incorporated herein by reference.

Figure 3:
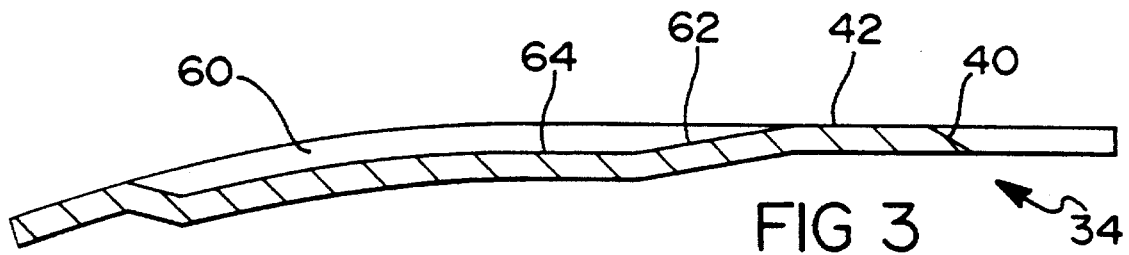
FIG. 3 is a sectional view taken substantially along line 3—3 in FIG. 2.

The vane 34 also includes a depression 60 beginning adjacent the leading surface area 42 and extending to the trailing edge 44. As best shown in FIG. 3, a raised wall portion 62 couples the smooth, continuous bottom 64 of the depression 60 with the leading surface area 42. The raised wall 62 forms an effective rib for reinforcing the flat leading surface area 42 and improves the operation of the impeller. Moreover, the blade permits a smooth continuous flow along the blade surface until the trailing edge. As is also shown in FIG. 3, the leading edge 40 is tapered to a point, and preferably the trailing edge 44 is also sharpened in the same manner. Nevertheless, unlike the previously known ribbed vanes, the depression 60 does not terminate intermediate the leading surface area and trailing edge of the blade so as to introduce additional turbulence to the flow as the fluid bears against the blade 34 in the impeller 12.

Figure 4:
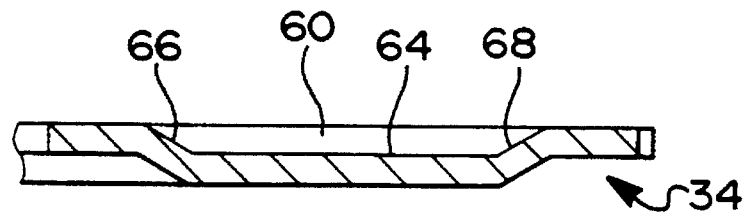
FIG. 4 is a sectional view taken substantially along line 4—4 in FIG. 2.

Referring now to FIG. 4, the depression 60 is shown as having an expanded width and a substantially flat bottom 64. Raised walls 66 and 68 on opposite sides of the blade form ribs adjacent the generally parallel flat peripheral edges of the blade as shown, for example, in FIG. 4, to reinforce and dimensionally stabilize the blade and the tabs 48 and 46. Moreover, the gradual inclination of the raised wall portions 66 and 68 avoids the introduction of turbulence in the flow through the impeller 12.

Having thus described the important structural features of the present invention, the use and advantages of the invention are readily described. The vanes are lightweight and require minimal material thickness to retain strength. The advantage of reinforcing ribs is integrally incorporated throughout the length of the blade and across the width of the leading surface. In addition, the blades avoid the turbulence introduced by previously known ribs which began and ended within the body of the vane. Moreover, the vanes avoid the instability of previously known flat blades, and provides substantial reinforcement to the mounting tabs of the vanes. Moreover, the combination of low weight and low turbulence in the fluid flow through the vaned element permits substantially higher speeds to be attained, especially when the present invention is used in conjunction with the vane mounting method described in U.S. Pat. No. 4,868,365. Moreover, a reduced number of vanes could be employed in each vaned element, and a reduced thickness housing can be employed where the strength of the blade and the strength in the welds mounting the blades to the housing compensate for the material strength of the housing previously required.

Having thus described the present invention, many modifications thereto will become apparent to those skilled in the art to ,which it pertains without departing from the scope and spirit of the present invention as defined in the appended claims.

What is claimed is:

1. A torque converter vane comprising:

a blade having a leading edge and a trailing edge;

a flat depression formed in said blade intermediate generally parallel flat surfaces and extending along said blade to said trailing edge; and wherein said blade includes a flat leading surface adjacent said leading edge and said depression is adjacent said leading surface.

2. The invention as defined in claim 1 wherein said blade includes at least one raised surface adjacent said depression.

3. The invention as defined in claim 1 wherein said blade includes a raised surface adjacent each longitudinal edge of said depression.

4. The invention as defined in claim 1 wherein said leading edge is tapered.

5. The invention as defined in claim 4 wherein said trailing edge is tapered.

6. The invention as defined in claim 1 wherein a raised wall portion joins said depression to said flat leading surface.

7. The invention as defined in claim 6 wherein said raised wall forms a transverse rib.

8. A method for making a motor vehicle fluid coupling having a pump and a turbine, wherein at least one of the pump and the turbine have a plurality of vanes installed between a housing and a shroud, wherein the vanes include peripheral tabs aligned with recesses in said housing or said shroud, the method comprising the step of:

forming a flat depression in said vanes adjacent generally parallel flat surfaces extending along said blade to a trailing edge of said blade.

9. The invention as defined in claim 8 and further comprising installing said vanes by automated delivery and insesrtion of said tabs in said recesses.

10. The invention as defined in claim 8 wherein said depression is formed adjacent a flat leading edge and terminates at an elongated transverse rib.

11. A torque converter comprising:

an impeller;

a turbine axially adjacent said impeller;

each of said impeller and turbine having a housing, a shroud and a plurality of vanes mounted between said housing and said shroud to define a substantially toroidal flow path through said torque converter;

each said vane having a flat leading edge surface, a flat depression extending from said leading edge surface to a trailing edge of said vane, raised :surface areas on opposite sides of said depression forming a support rib along each inner and outer peripheral edge of said blade adjacent generally parallel flat surfaces, and a transverse rib formed by said depression at said leading edge surface.

12. A torque converter vane comprising:

a blade having a leading edge and a trailing edge and;

a flat depression formed in said blade intermediate generally parallel flat surfaces and extending along said blade to said trailing edge.

* * * * *